(No Model.) 3 Sheets—Sheet 1.

S. H. RICHMOND.
SECTIONAL VENTILATING CHIMNEY.

No. 515,482. Patented Feb. 27, 1894.

WITNESSES
H. A. Lamb
Pearl Reynolds

INVENTOR
Samuel H. Richmond
By A. M. Wooster
Atty.

(No Model.) 3 Sheets—Sheet 2.

S. H. RICHMOND.
SECTIONAL VENTILATING CHIMNEY.

No. 515,482. Patented Feb. 27, 1894.

WITNESSES
H. A. Lamb
Pearl Reynolds.

INVENTOR
Samuel H. Richmond
By
A. M. Wooster Atty (No Model.) 3 Sheets—Sheet 3.

S. H. RICHMOND.
SECTIONAL VENTILATING CHIMNEY.

No. 515,482. Patented Feb. 27, 1894.

WITNESSES
H. A. Lamb
Pearl Reynolds

INVENTOR
Samuel H. Richmond
By A. M. Wooster
Atty.

UNITED STATES PATENT OFFICE.

SAMUEL H. RICHMOND, OF NORWALK, ASSIGNOR OF ONE-HALF TO JONAS H. CLUTE AND FRANKLIN M. RAYMOND, OF WESTPORT, CONNECTICUT.

SECTIONAL VENTILATING-CHIMNEY.

SPECIFICATION forming part of Letters Patent No. 515,482, dated February 27, 1894.

Application filed September 13, 1893. Serial No. 485,387. (No model.)

*To all whom it may concern:*

Be it known that I, SAMUEL H. RICHMOND, a citizen of the United States, residing at Norwalk, in the county of Fairfield and State of Connecticut, have invented certain new and useful Improvements in Sectional Ventilating-Chimneys; and I do hereby declare the following to be a full, clear, and exact description of the invention, such as will enable others skilled in the art to which it appertains to make and use the same.

My invention has for its object to provide an inexpensive, durable and perfectly safe chimney or flue for houses, and which shall furthermore be adapted to serve either as a heating or ventilating flue or for both purposes simultaneously.

With these ends in view I have devised the novel sectional ventilating chimney which I will now describe referring by numbers and letters to the accompanying drawings forming part of this specification in which—

Figure 1:
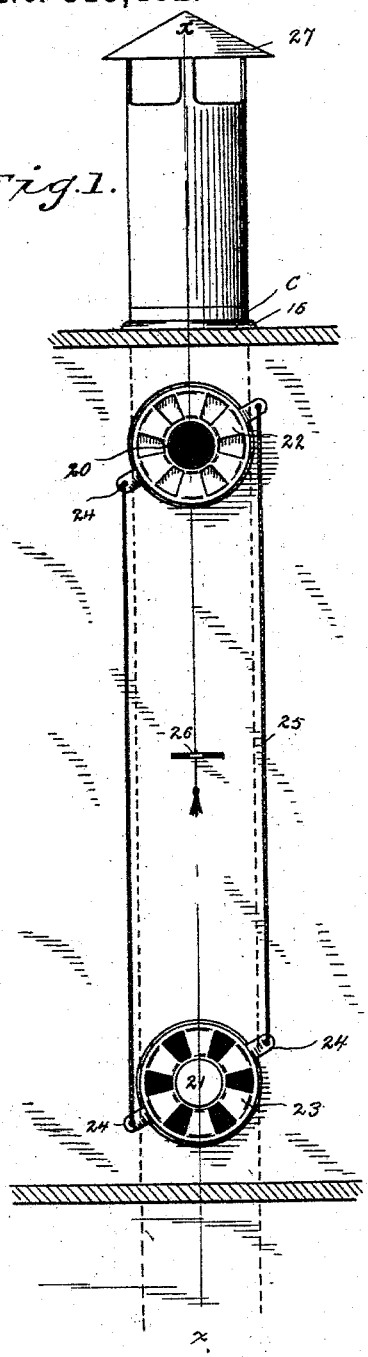
Figure 2:
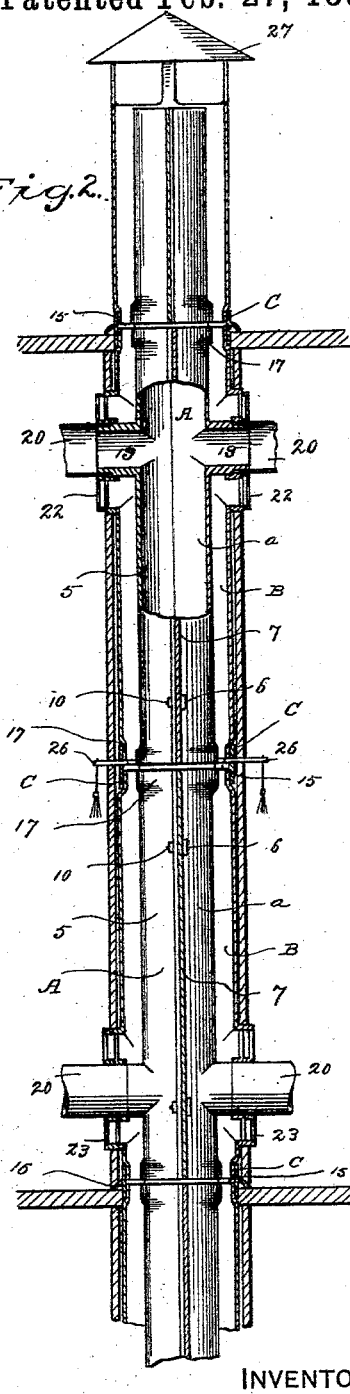
Figure 3:
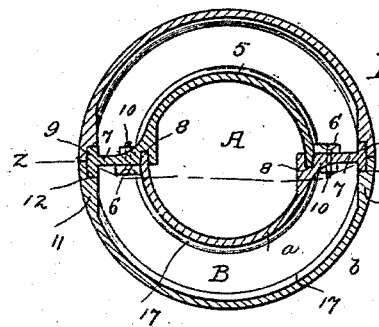
Figure 5:
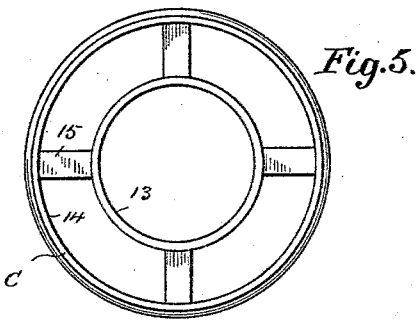
Figure 4:
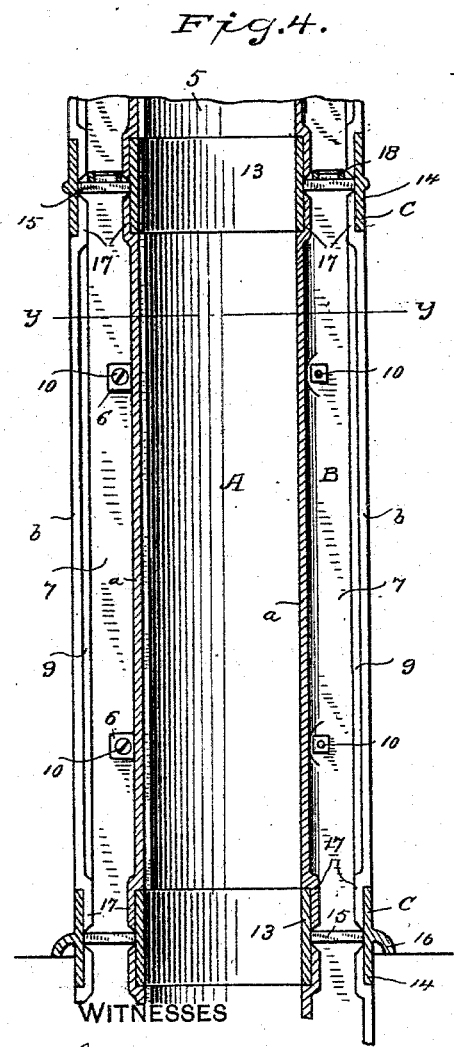
Figure 6:
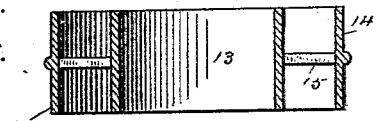
Figure 7:
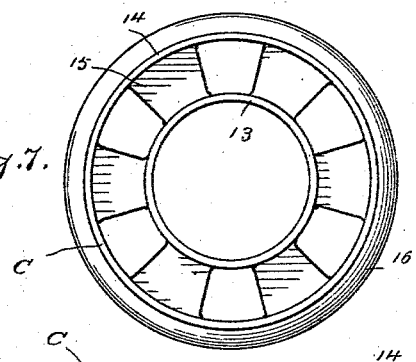
Figure 8:
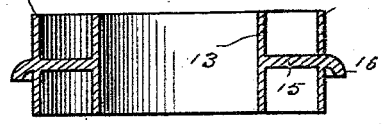
Figure 9:
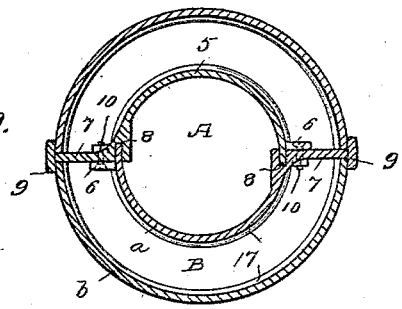
Figure 10:
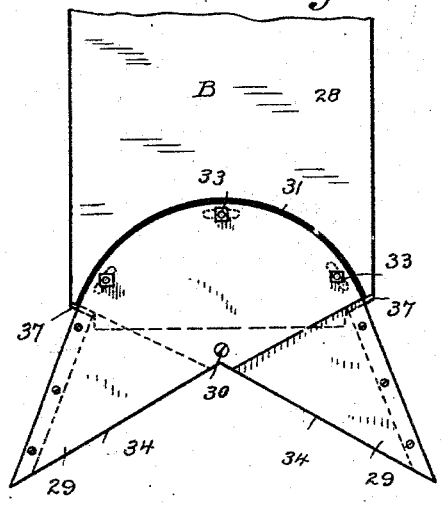
Figure 11:
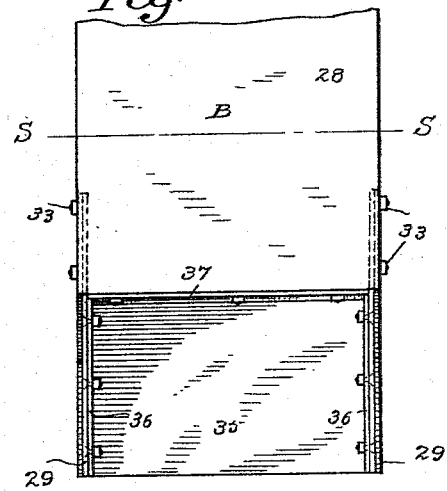
Figure 12:
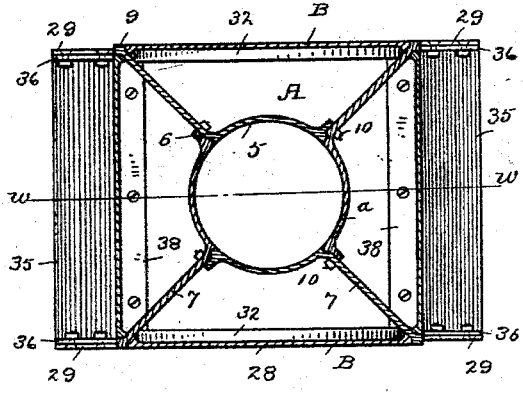
Figure 13:
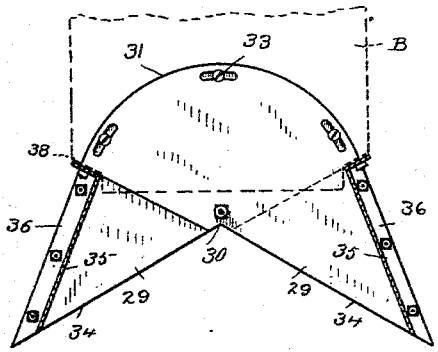

Figure 1 is an elevation of my novel chimney set up, a roof and floor being indicated in section; Fig. 2 a section on the line $x\,x$ in Fig. 1; Fig. 3 a horizontal section on an enlarged scale on the line $y\,y$ in Fig. 4, showing each flue made in two sections; Fig. 4 a vertical section the line being indicated by $z\,z$ in Fig. 3; Fig. 5 a plan view and Fig. 6 a section of an ordinary simple form of union for securing the outer half sections together; Fig. 7 a plan view and Fig. 8 a section of another form of union which is intended to carry a damper; Fig. 9 a section corresponding with Fig. 3 illustrating another way of assembling the sections; Fig. 10 a detail end elevation illustrating a form in which the chimney is made square above the roof and also showing the roof plates; Fig. 11 a detail side elevation corresponding therewith; Fig. 12 a horizontal section on the line $s\,s$ in Fig. 11 looking down showing the inner flue made in four sections and the sections assembled in still another way, and Fig. 13 is a detail sectional view on the line $w\,w$ in Fig. 12 the chimney being omitted but its relative position indicated by dotted lines.

A denotes the inner flue and B the outer flues. Each of these flues is made in sections denoted respectively by "$a$" and "$b$" and the sets of sections are connected by unions C. The sections and unions may be made of any suitable material. I preferably however make them of iron and cast the parts the exact shape required.

An important feature of my invention is that the parts are all interchangeable.

The sections of the inner flue comprise arc shaped portions 5 each section being provided on one side near its edge with outwardly extending lugs 6 and on the other side with an outwardly extending flange 7 which may, as in Figs. 3 and 5, have on its outer face a groove 8 and is provided at its extreme end with an enlargement 9.

The sections of the inner flue are assembled as clearly shown in Figs. 3, 9 and 12, the edges of the arc shaped portions engaging the other sections, and lugs 6 lying in contact with flanges 7 to which they are secured by bolts 10.

The assembled inner flue is held central in and is securely fastened to the sections comprising the wall of the outer flue as shown either in Figs. 3, 9 or 12.

In the form illustrated in Fig. 3 the sections of the outer flue are provided at their ends with thickened portions 11 which correspond with each other and in the meeting edges of which are formed recesses 12 which receive the enlargements 9.

In the form illustrated in Fig. 9 flanges 7 are made relatively longer and the ends of the sections comprising the wall of the outer flue fit in under the enlargement and abut against flange 7 as clearly shown in said figure.

In the form illustrated in Fig. 12 the inner flue is made in four sections which are assembled in a slightly different way, and the portion of the outer flue above the roof is made angular instead of round as will be again referred to.

The ends of the sections of both the inner and outer flues are provided with off-sets 17 either outward or inward as may be required to engage the unions as clearly shown in Fig. 4. This is in order to leave the inner surface of the inner flue smooth and unobstructed and the outer surface of the outer flue likewise smooth and free from projections or enlargements. The unions consist of an inner tube 13 and an outer tube 14 which are connected at approximately their mid-length by cross pieces 15. The unions may or may not be provided with outer flanges 16 adapted to rest upon a floor or roof. Where a union is intended to carry a damper the cross pieces are made as in Fig. 7 and the dampers 18 are made to correspond therewith so that when the cross pieces of the damper and union register the damper will be open and when moved to the opposite position the damper will be closed. Where the union is only intended to secure sections of the inner and outer flues together I preferably provide them with four cross pieces only, as in Fig. 5. Dampers 18 may be placed at any required place as indicated in Figs. 1 and 2. These dampers close the outer flue only and have nothing to do with the inner flue, the inner flue being kept at all times open and unobstructed for the passage of smoke from the stove or furnace. The inner flue may or may not be provided with hubs 19 which extend through the outer flue and are adapted to receive stove-pipes 20 if required from any of the rooms. When it is not desired to attach a stove pipe the hub is closed by a cap 21, see Fig. 1.

22 denotes a damper near the top of the room and 23 a damper near the bottom of the room both leading into the outer flue. These dampers are provided with lugs 24 on opposite sides which are connected by means of cords 25, said dampers being so arranged that when one is open the other is closed. The dampers 18 are provided with hand pieces 26 which extend out into the room and permit the operator to open or close the damper as may be required for proper use in connection with dampers 22 and 23.

In addition to being durable, inexpensive and perfectly safe my novel chimney being built in sections and the sections being connected to the different parts of the house, will settle at all times to correspond with the house so that there will be no danger to the chimney from settling. The construction is such as to utilize all the heat radiated from the inner flue for the purpose of warming air in the outer flue which may be used for heating purposes or to assist in ventilation.

My invention lies in the construction of the chimney and not in any special use to which it may be placed.

The use in connection with the hot air chamber of a furnace will be apparent. Suppose for instance that outer flue B is connected with the hot air chamber of a furnace and that it is desired to heat a room as in Figs. 1 and 2. The hubs 19 would be closed by caps 21 and damper 18 in the union would be closed by means of hand piece 26. This would prevent the passage of the hot air in the outer flue out at the top thereof and would permit it to pass out into the room when required. Dampers 22 and 23 would then be moved to the position shown in Fig. 1 the upper damper being closed and the lower damper open. This would prevent the passage of air out of the room into the outer flue and would permit the heated air in the outer flue to pass out into the room. Should it be desired to combine heating and ventilation dampers 22 and 23 would be turned to an intermediate position in which each is partially open. This would permit heated air from below damper 18 to pass out into the room and would permit air from the room to pass out into the outer flue above the damper 18. This is only one use of my novel chimney. Where it is not desired to use it in connection with a furnace but to heat the rooms by stoves entirely, the action of the flues is precisely the same. The inner flue serves as a common smoke pipe for all of the stoves and the heat radiated therefrom necessarily warms the air in the outer flue which may be allowed to pass out into the rooms as already described, and the air in the rooms may be allowed to pass out into the flues as has also been clearly described.

As shown in the drawings flanges 7 are made solid. This is in order to divide the outer flue into two or more entirely separate compartments which is preferable in a double house and in houses constructed to rent in flats.

Where my novel chimney is used in a single house, openings, not shown in the drawings, may be cast in the flanges so that the outer flue will comprise but a single compartment. The inner and outer flues are both extended upward as far above the roof as may be required and are preferably covered by a cap 27.

It will be apparent that my novel chimney is admirably adapted for cooling and ventilating purposes in warm weather without any changes whatever.

In Figs. 10 to 13 inclusive I have illustrated a form in which the wall of the outer flue is made angular above the roof. The number of sections of which either the inner or the outer flues are constructed is of course not of the essence of my invention.

In Fig. 12 I have shown the inner flue as made in four sections each section having a flange 7 with an enlargement 9 at its outer end, said flanges lying at right angles to each other and supporting the plates 28 which comprise the angular portion of the chimney above the roof and which are secured to said enlargements. When the chimney is made in this form the portion above the roof may be supported in any preferred manner.

In Figs. 10, 11 and 13 I have illustrated a simple and practical mode of bracing and holding the portion above the roof. 29 denotes plates which I term roof plates and which are pivoted to each other as at 30. The upper ends of these plates slide one under the other in depressions 31 in the ends of the chimney, the upper ends of said depressions terminating in inwardly extending curved flanges 32, see Fig. 12. The upper ends of these plates are rigidly secured to the end plates 28 of the chimney by means of bolts 33 which are fixed in one of said plates and pass through slots in the other plate. It will be seen that this adjustment permits the lower inner edges of the roof plates indicated by 34, to conform to the pitch of the roof. 35 denotes cross plates between the roof plates which are provided with end flanges 36 which are bolted to the roof plates as clearly shown, and with top flanges 37, see Fig. 13 upon which the angular portion of the chimney rests, the lower side plates of the chimney being preferably provided with flanges 38 see Fig. 12, which rest upon flanges 37 as will be apparent from Figs. 10 and 13 in connection with Fig. 12.

Having thus described my invention, I claim—

1. A chimney comprising an inner flue whose wall consists of portions 5 each of which is adapted to abut against the edge of another portion and is provided with a flange 7 and with lugs 6 adapted to be bolted to said flanges, and an outer flue whose wall likewise consists of sections, and unions consisting of inner and outer tubes connected together by cross pieces by which the sections of the inner and outer flues are connected together.

2. The interchangeable sections "b" each consisting of a portion 5 adapted to abut against a corresponding section, a flange 7 and lugs 6 by which it is attached to the corresponding section.

3. A chimney consisting of inner sections "a" and outer sections "b" joined together by unions C said sections "a" comprising portions 5, grooves 8 to receive the edge of the other portion, flanges 7 having cross flanges 9 and lugs 6 for attachment to flanges 7, and said sections "b" being provided with enlargements having recesses 12 to receive the cross flanges.

4. A chimney consisting of inner sections "a" and outer sections "b," said inner sections being provided with flanges 7 by which said sections are secured together and to the outer sections and said inner and outer sections being provided with off-sets 17, and unions comprising inner and outer tubes which receive the off-sets on the inner and outer sections between them, and which are secured together by cross pieces 15.

5. The combination with inner flue A and outer flue B each made in independent sections, of unions consisting of inner and outer tubes connected by cross pieces which receive the ends of the sections between them, and dampers resting on said cross pieces by which the passage of air in the outer flue may be cut off at any time.

6. The combination with the inner flue and the outer flue provided with dampers 18 said inner flue having hubs 19 extending through the outer flue, of dampers 22 and 23 in said outer flue surrounding the hubs, and caps for closing said hubs when required.

7. In combination plates 28, roof plates 29 pivoted to each other and having inner edges adapted to correspond with the angle of a roof, and suitable means for locking said plates together and to plates 28 and cross plates 35 having end flanges by which they are bolted to the roof plates.

8. The combination with plates 28 comprising the angular portion of the chimney, of the sectional inner flue having flanges 7 to which plates 28 are secured, roof plates 29 pivoted to each other and adjustably secured to plates 28, and cross plates lying between the roof plates.

9. The combination with plates 28 comprising the angular portion of the chimney two of said plates having depressions 31 and the other two having flanges 38, of the sectional inner flue having flanges 7 to which plates 28 are secured, the roof plates pivoted to each other and adjustably secured in depressions 31, and cross plates 35 having end flanges which are bolted to the roof plates and top flanges 37 upon which plates 28 rest.

In testimony whereof I affix my signature in presence of two witnesses.

SAMUEL H. RICHMOND.

Witnesses:
 H. A. LAMB,
 PEARL REYNOLDS.